E. SMITH.
CHUCK.
APPLICATION FILED JULY 12, 1917.

1,258,714.

Patented Mar. 12, 1918.

Emil Smith
Inventor

UNITED STATES PATENT OFFICE.

EMIL SMITH, OF FLINT, MICHIGAN.

CHUCK.

1,258,714.	Specification of Letters Patent.	Patented Mar. 12, 1918.

Application filed July 12, 1917. Serial No. 180,137.

*To all whom it may concern:*

Be it known that I, EMIL SMITH, a citizen of the United States, residing at Flint, in the county of Genesee and State of Michigan, have invented new and useful Improvements in Chucks, of which the following is a specification.

The chuck which is the subject matter of the present application for patent is designed more particularly for use in connection with the tool disclosed in Patent No. 1230814, granted to myself on June 19, 1917, said tool being employed for holding rods to facilitate the application of nuts thereto. The chuck is used for holding the nuts to be screwed on the rods, and it consists of a novel combination and arrangement of parts to be hereinafter described and claimed, the object of the invention being to provide a chuck which is particularly adapted for the work referred to hereinbefore and which is provided with a device which acts as a gage so that the work is of uniform character, the nuts of all the rods being properly and accurately positioned thereon.

Figure 1:
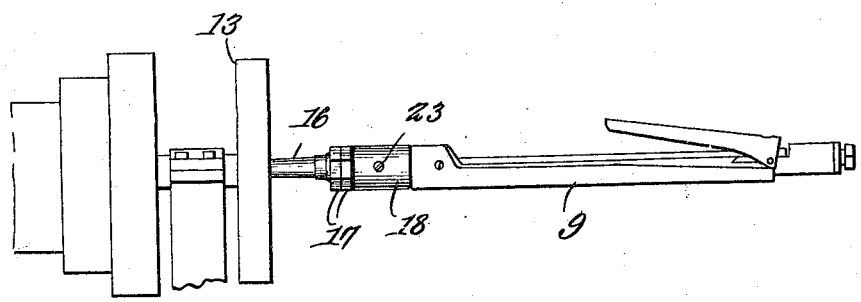
Figure 2:
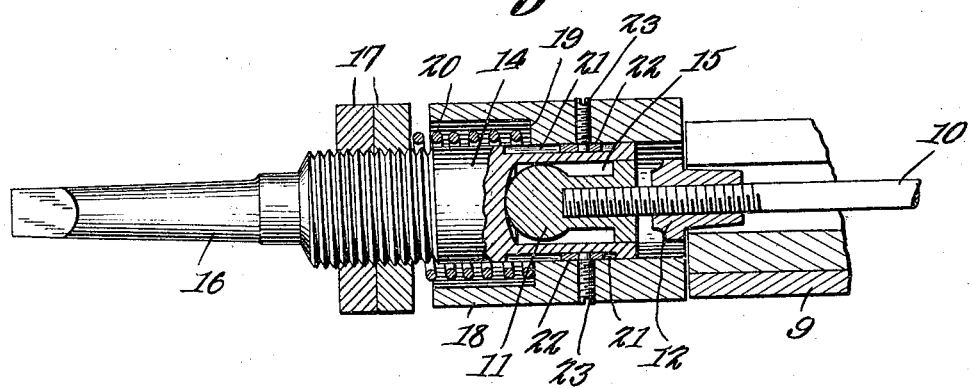

In order that the invention may be better understood, reference is had to the accompanying drawing forming a part of this specification, and in said drawing, Figure 1 is an elevation of the chuck, and Fig. 2 is an enlarged longitudinal section thereof.

Referring specifically to the drawing, 9 denotes the rod-holding tool disclosed in the Patent No. 1230814 hereinbefore referred to. The tool is designed for holding a valve push rod 10 to facilitate the application of the nut 11 thereto, and also the lock nut 12. The nuts are held by a chuck carried by some rotatable, power-driven means 13. This chuck comprises a cylindrical body 14 having at one end a socket 15 in which the nuts are adapted to be seated. From the rear end of the chuck body extends a shank 16 having suitable means for attachment to the member 13. The rear end of the chuck body also has a short externally screw-threaded portion to receive two lock nuts 17 for a purpose to be presently described.

Over the outside of the chuck body 14 fits loosely a sleeve 18 which is free to slide thereon lengthwise. The rear end of the sleeve has an enlarged internal diameter producing a shoulder 19 between which latter and the inner one of the nuts 17 is located a spring 20, the same being coiled around the chuck body.

In the side of the chuck body 14, at diametrically opposite points, are longitudinal grooves 21 in which seat slide blocks 22, and the sleeve 18 is tapped to receive two diametrically opposite screws 23 which seat at their inner ends in apertures in the blocks 22. Thus, the sleeve is held against rotating on the chuck body, but it is free to slide thereon a distance corresponding to the sliding movement which the blocks 22 may have in the grooves 21.

The spring 20 holds the sleeve 18 advanced normally to the limit of its outward sliding movement, and in this position it projects a short distance beyond the socketed end of the chuck body 14. The extent to which the sleeve projects may be varied by screwing the nuts 17 forward or back.

In operation, the lock nut 12 is first run on the rod 10 by hand just far enough to hold, and it is then inserted into the chuck socket 15 and run back the required distance, after which the nut 11 is applied in the same manner. The sleeve 18 acts as a gage so that the nuts are run on the rod the proper distance, which is of the utmost importance as the rods must all be of the same length. The work can also be speeded up considerably.

When the first nut 12 is applied, the holder is pushed up against the end of the sleeve 18 and the latter is forced rearward as far as the lock nuts 17 allow. This shortens the space in the sleeve beyond the outer end of the chuck body 14, and the socketed end of the chuck body is thus brought closer to the outer end of the holder 9. The space in the sleeve is long enough to seat the axial length of the polygonal portion of the nut, and as soon as this part of the nut leaves the socket 15 and enters this space, the nut stops turning. When the nut 11 is applied, the holder 9 is not pushed against the sleeve 18 to force it rearward, and hence the maximum space in the sleeve 18 beyond the outer end of the chuck body 14 is obtained, said space being now longer than the axial length of the polygonal portion of the nut 12, there being a sufficient extra space to accommodate the polygonal portion of the nut 11. It will therefor be seen that when the polygonal portion of the nut 11 enters the sleeve space, it stops turning just before it reaches the nut 12, and hence it is not jammed against the latter, which is desirable as the nuts need adjustment when the valve push-rod 10 is assembled in the engine, and which adjustment would be rendered difficult without the use of a wrench if the two nuts were jammed tightly together. If the nut 12 is left loose, the adjustments can be readily made with the fingers. As the rod holder 9 disclosed in Patent 1230814 is provided with an adjustable stop engageable by the rear end of the rod 10, said rod is readily positioned in the holder so that its threaded end which is to receive the nuts projects the proper distance from the holder to permit the nuts to be run on as hereinbefore described.

I claim:—

1. A chuck comprising a body having an end work-holding socket, a gage sleeve slidably mounted on the body and projecting from the socketed end thereof, an abutment on the chuck body, and a spring between the abutment and the sleeve for holding the same projected.

2. A chuck comprising a body having an end work-holding socket, a gage sleeve slidably mounted on the body and projecting from the socketed end thereof, and a spring engageable with the sleeve for holding the same projected.

3. A chuck comprising a body having an end work-holding socket, a gage sleeve slidably mounted on the body and projecting from the socketed end thereof, the chuck body having longitudinal slots on the outside, blocks slidably mounted in said slots, and screws threaded through the sleeve and engaging the blocks.

4. A chuck comprising a body having an end work-holding socket, a gage sleeve slidably mounted on the body and projecting from the socketed end thereof, a spring engageable with the sleeve for holding the same projected, the chuck body having longitudinal slots on the outside, blocks slidably mounted in said slots, and screws threaded through the sleeve and engaging the blocks.

In testimony whereof I affix my signature.

EMIL SMITH.

Copies of this patent may be obtained for five cents each, by addressing the "Commissioner of Patents, Washington, D. C."